(12) United States Patent
Shirley et al.

(10) Patent No.: US 7,477,985 B2
(45) Date of Patent: Jan. 13, 2009

(54) METHOD AND APPARATUS FOR DISPLAYING TCAS INFORMATION WITH ENHANCED VERTICAL SITUATIONAL AWARENESS

(75) Inventors: David A. Shirley, Goodyear, AZ (US); John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/201,634

(22) Filed: Aug. 10, 2005

(65) Prior Publication Data

US 2007/0038339 A1 Feb. 15, 2007

(51) Int. Cl.
 *G01S 7/22* (2006.01)
 *G06F 19/00* (2006.01)
(52) U.S. Cl. .............................. 701/120; 701/4; 340/977
(58) Field of Classification Search ........................ None
See application file for complete search history.

(56) References Cited

U.S. PATENT DOCUMENTS

| 3,300,778 | A | | 1/1967 | Vickers | |
| 5,179,377 | A | * | 1/1993 | Hancock | 340/961 |
| 6,085,150 | A | * | 7/2000 | Henry et al. | 701/301 |
| 6,348,877 | B1 | * | 2/2002 | Berstis et al. | 340/980 |
| 6,683,541 | B2 | | 1/2004 | Staggs et al. | |
| 6,970,107 | B2 | * | 11/2005 | Gannett | 340/967 |
| 7,307,578 | B2 | * | 12/2007 | Blaskovich et al. | 342/29 |
| 2006/0004496 | A1 | * | 1/2006 | Tucker et al. | 701/4 |

FOREIGN PATENT DOCUMENTS

EP 0405430 1/1991

* cited by examiner

*Primary Examiner*—Michael J. Zanelli
(74) *Attorney, Agent, or Firm*—Ingrassia, Fisher & Lorenz, P.C.

(57) ABSTRACT

Systems and methods are provided for using a display system for a first vehicle. The system includes a processor adapted to receive data representative of a position of the first vehicle and operable, in response thereto, to supply one or more image rendering display commands and a display device coupled to receive the image rendering display commands and operable, in response thereto, to simultaneously render (i) a first vehicle icon representing the position of the first vehicle and (ii) one or more altitude lines, wherein each altitude line extends at least partially across the image and represents a vertical distance from the first vehicle.

16 Claims, 2 Drawing Sheets

METHOD AND APPARATUS FOR DISPLAYING TCAS INFORMATION WITH ENHANCED VERTICAL SITUATIONAL AWARENESS

FIELD OF THE INVENTION

The present invention relates to a display for a vehicle and, more particularly, to a system and method for displaying altitude information in a vertical view display.

BACKGROUND

Modern multifunctional map displays, particularly those used in vehicles, such as aircraft, watercraft, or spacecraft, are capable of displaying a considerable amount of information. For example, information such as vehicle position, attitude, navigation, target, and terrain information may be displayed. Most modern displays additionally allow a vehicle flight plan to be displayed from different views, either a lateral view, a vertical view, or perspective views which can be displayed individually or simultaneously on the same display.

The lateral view, generally known as a lateral map display, is basically a two-dimensional, top-view of the aircraft flight plan, and may include various map features including, for example, weather information, terrain information, political boundaries, and navigation aids. Various symbols, for example, a top-view aircraft symbol and/or symbols of vehicles nearby, may be superimposed over the displayed information. Additionally, information associated with either the aircraft or the vehicles nearby may be displayed as well. The vertical view provides two-dimensional views of the flight plan, while perspective views typically provide three-dimensional views of the vehicle flight plan. Each view display may also include one or more of the above-mentioned features that are displayed on the lateral map.

At times, a pilot may require certain information relating to one or more of the vehicles nearby. For example, altitude information of one or more of the vehicles may be needed. Typically to obtain such information, the pilot views a lateral map display where the altitude information is displayed as a numerical message adjacent the symbols of the vehicles. In some cases, the pilot may be able to switch to a vertical or a perspective view map display. However, these displays typically show the vehicles and the aircraft in a three-dimensional manner and, therefore, may not provide a clear point of reference for the pilot. Consequently, the pilot may have difficulty accurately determining the altitude of the vehicles. Additionally, neither current vertical nor perspective view map display allows the pilot to easily determine directional and/or speed trend information related to those vehicles.

Hence, there is a need for a display system and method that addresses one or more of the above-noted drawbacks. Namely, there is a need for a display system and method that allows a pilot to easily and accurately determine a vertical distance of one or more vehicles located within a predetermined proximity of an aircraft. The present invention addresses one or more of these needs.

BRIEF SUMMARY OF THE INVENTION

Systems and methods are provided for using a display system for a first vehicle. In one embodiment, by way of example only, the system includes a processor adapted to receive data representative of a position of the first vehicle and operable, in response thereto, to supply one or more image rendering display commands and a display device coupled to receive the image rendering display commands and operable, in response thereto, to simultaneously render (i) a first vehicle icon representing the position of the first vehicle and (ii) one or more altitude lines, wherein each altitude line extends at least partially across the image and represents a vertical distance from the first vehicle.

In another example, and by way of example only, the display includes a processor and a display device. The processor is adapted to receive data representative of a position of the aircraft and data representative of a position of a vehicle located within a predetermined distance of the aircraft, and is operable, in response thereto, to supply one or more image rendering display commands. The display device is coupled to receive the image rendering display commands and operable, in response thereto, to simultaneously render (i) an aircraft icon representing the position of the aircraft, (ii) a vehicle icon representing the position of the vehicle, and (iii) one or more altitude lines. Each altitude line extends at least partially across the image and represents a vertical distance from the aircraft. A first altitude line of the one or more altitude lines represents a first plane within which the aircraft is located. A second altitude line of the one or more altitude lines represents a second plane that is parallel to the first plane and is a predetermined distance from the aircraft.

In another embodiment, a method is provided for displaying on an aircraft flight deck display system an altitude of a vehicle located within a predetermined distance of an aircraft. The method comprises the steps of processing data representative of a position of the aircraft and data representative of a position of the vehicle, and simultaneously displaying (i) an aircraft icon representing the position of the aircraft, (ii) a first vehicle icon representing the position of a vehicle, and (iii) one or more altitude lines, wherein each altitude line extends at least partially across the image and represents one or more vertical distances from the aircraft.

BRIEF DESCRIPTION OF THE DRAWINGS

The present invention will hereinafter be described in conjunction with the appended drawing figures, wherein like numerals denote like elements, and in which.

DETAILED DESCRIPTION OF THE INVENTION

Figure 1:
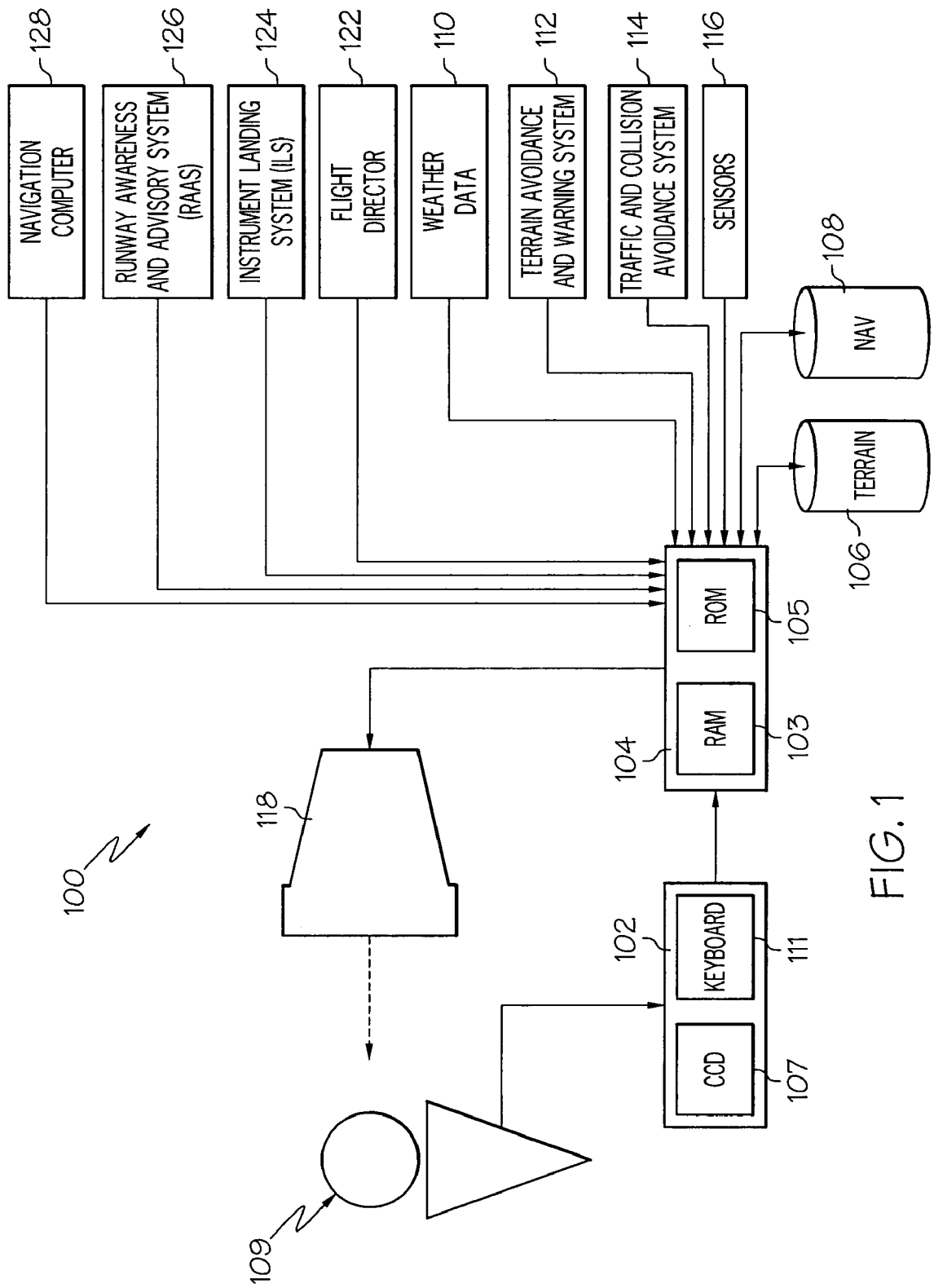
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the invention is described below as being implemented in aircraft, it will be appreciated that any other manned or unmanned vehicles, such as watercraft and spacecraft may alternatively incorporate the invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing, figures, or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary flight deck display system will be described. The system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, various sensors 116, and a display device 118. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 is in operable communication with the terrain databases 106, the navigation databases 108, and the display device 118, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to the display device 118, so that the retrieved terrain and navigation data are appropriately displayed on the display device 118. As FIG. 1 additionally shows, the processor 104 is also in operable communication with the source of weather data 110, the TAWS 112, the TCAS 114, and is additionally configured to supply appropriate display commands to the display device 118 so that the avionics data, weather data 110, data from the TAWS 112, data from the TCAS 114, and data from the previously mentioned external systems may also be selectively displayed on the display device 118. The preferred manner in which the terrain and navigation data are displayed on the display will be described in more detail further below. Before doing so, however, a brief description of the processor 104, the data sources 106-114, and the display device 118, at least in the depicted embodiment, will be provided.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data, including elevation data, representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain databases 106 and navigation databases 108 could also be part of a device or system that is physically separate from the display system 100.

The avionics data that is supplied from the sensors 116 includes data representative of the state of the aircraft such as, for example, aircraft speed, altitude, and heading. The weather data 108 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the display device 118 such that a graphic representation of each aircraft in the vicinity is displayed on the display device 118. The TAWS 112 supplies data representative of the location of terrain that may be a threat to the aircraft. The processor 104, in response to the TAWS data, preferably supplies appropriate display commands to the display device 118 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor 104 for display on the display device 118. In the depicted embodiment, these external systems include a flight director 122, an instrument landing system (ILS) 124, a runway awareness and advisory system (RAAS) 126, and a navigation computer 128. The flight director 122, as is generally known, supplies command data representative of commands for piloting the aircraft in response to flight crew entered data, or various inertial and avionics data received from external systems. The command data supplied by the flight director 122 may be supplied to the processor 104 and displayed on the display device 118 for use by the pilot 109, or the data may be supplied to an autopilot (not illustrated). The autopilot, in turn, produces appropriate control signals which are applied to the aircraft's flight control surfaces to cause the aircraft to fly in accordance with the flight crew entered data, or the inertial and avionics data.

The ILS 124 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 124 on board the aircraft receives these signals and supplies appropriate data to the processor for display of, for example, an ILS feather (not illustrated in FIG. 1) on the display device 118. The ILS feather represents two signals, a localizer signal that is used to provide lateral guidance, and a glide slope signal that is used for vertical guidance.

The RAAS 126 provides improved situational awareness to help lower the probability of runway incursions by providing timely aural advisories to the flight crew during taxi, takeoff, final approach, landing and rollout. The RAAS 126 uses GPS data to determine aircraft position and compares aircraft position to airport location data stored in the navigation database 108. Based on these comparisons, the RAAS 126, if necessary, issues appropriate aural advisories. The aural advisories the RAAS 126 may issue inform the pilot 109, among other things of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when the pilot 109 inadvertently begins to take off from a taxiway, and when an aircraft has been immobile on a runway for an extended time.

The navigation computer 128 is used, among other things, to allow the pilot 109 to program a flight plan from one destination to another. The navigation computer 128 may be in operable communication with the flight director 122. As was mentioned above, the flight director 122 may be used to automatically fly, or assist the pilot 109 in flying, the programmed route. The navigation computer 128 is in operable communication with various databases including, for example, the terrain database 106, and the navigation database 108. The processor 104 may receive the programmed flight plan data from the navigation computer 128 and cause programmed flight plan, or at least portions thereof, to be displayed on the display device 118.

The display device 118 is used to display various images and data, in both a graphical and a textual format, and to supply visual feedback to the user 109 in response to the user input commands supplied by the user 109 to the user interface 102. It will be appreciated that the display device 118 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display element 104 includes a panel display. To provide a more complete description of the method that is implemented by the flight management system 100, a general description of the display device 118 and its layout will now be provided.

Figure 2:
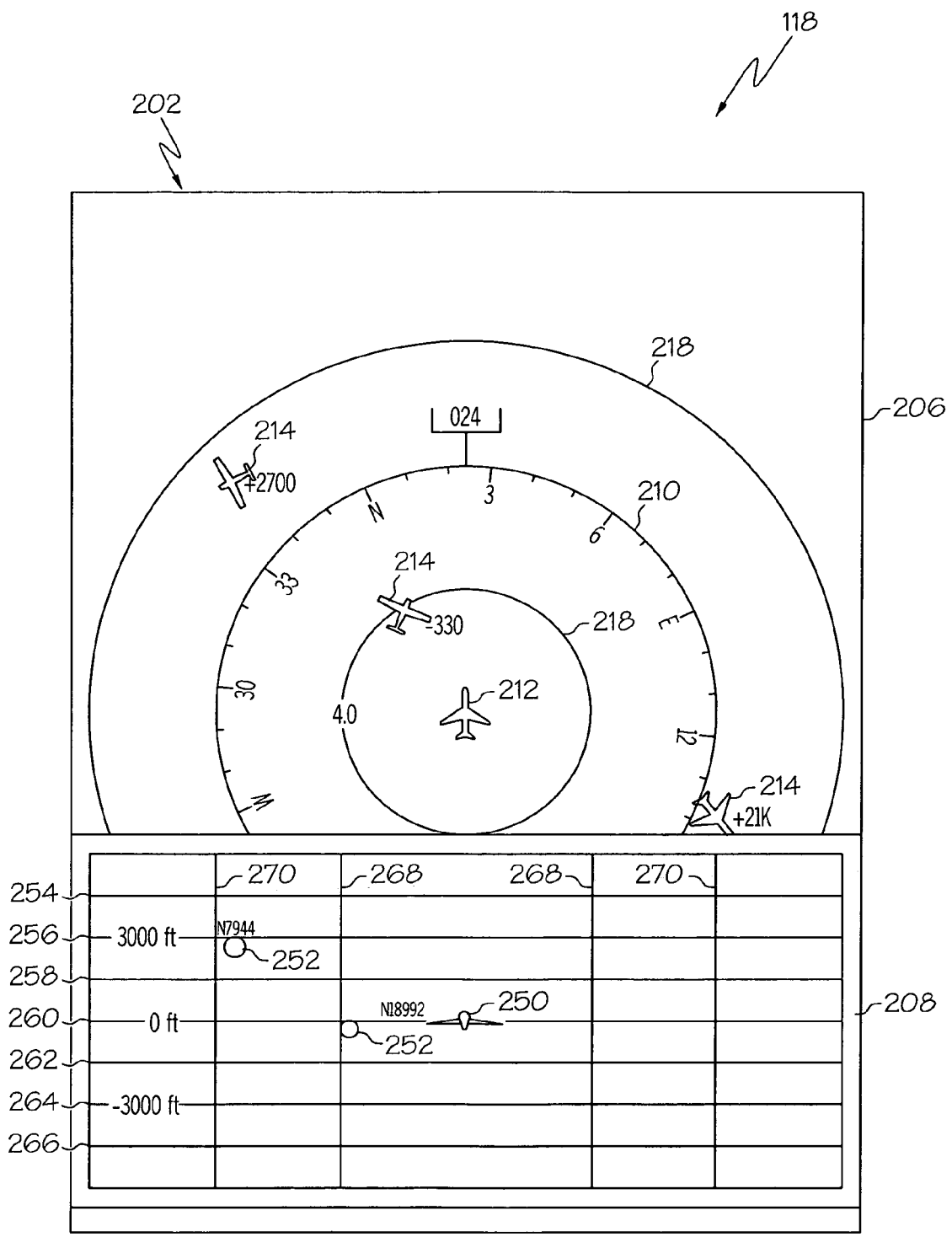
FIG. 2 is a simplified representation of an exemplary display screen that may be used in the system of FIG. 1, which shows the overall layout of the display screen, and on which is various graphical and textual images are simultaneously displayed.

With reference to FIG. 2, it is seen that the display device 118 includes a display area 202 in which multiple graphical and textual images may be simultaneously displayed, preferably in different sections of the display area 202. For example, a lateral situation display 206 and a vertical situation view display 208 may be displayed simultaneously, alone, or in various combinations, in various sections of the display area 202.

The lateral situation display 206 includes a top-view aircraft icon 212, a compass 210, one or more vehicle icons 214 representing other vehicles within a predetermined proximity to the aircraft, and one or more range rings 218. The lateral situation display 206 may also include various map features including, but not limited to, a lateral two-dimensional view of terrain below the flight plan, political boundaries, and navigation aids. Each of the vehicle icons 214 may have associated identifying information that may be displayed therewith. For example, as shown in FIG. 2, each vehicle icon 214 includes numbers that each represents a vertical distance from the aircraft icon 212. Alternatively the vehicle icons 214 may be displayed with other identifying information, such as, for example, a tail number of the vehicle, vertical trend sense (i.e. whether the vehicle is climbing, descending, or level), the type of vehicle, and the level of threat (i.e., in one embodiment, the shape or color of the vehicle icon 214 may change depending on threat level). Although three vehicle icons 214 are depicted, it will be appreciated that the number of icons 214 will depend on the number of vehicles that are located within a predetermined proximity to the aircraft. It will further be appreciated that as the predetermined proximity may be adjusted according to a desired view, and the number of vehicles may vary. The range rings 218 may be used to indicate sequential ranges, such as fixed distance or time ranges needed to travel from the top-view aircraft symbol 212 to another position, or any other information that may be useful to a pilot. In the illustrated embodiment, the range rings 218 indicate distances from the aircraft symbol 212.

The vertical situation view display 208 includes an aircraft icon 250, icons of nearby vehicles 252, a plurality of altitude lines 254, 256, 258, 260, 262, 264, 266, and vertical range lines 268, 270. The vertical situation view display 208 provides a view from the aircraft looking forward from its tail-cone. It will be appreciated that although the vertical situation view display 208 depicted in FIG. 2 is forward-looking, any other view, such as, for example, a side view or a rear-looking view may alternatively be employed or selected.

The aircraft icon 250 and vehicle icons 252 correspond with the aircraft icon 212 and vehicle icons 214 of the lateral view display 206, respectively. The icons 250, 252 may be any suitably recognizable symbol that may be used to represent aircraft and/or other vehicles. Each of the vehicle icons 252 is preferably appropriately spaced apart from the aircraft icon 250 to thereby provide a visual indication of the vertical distance therebetween. The vehicle icons 252 may additionally be spaced apart from the aircraft icon 250 to indicate a horizontal distance therebetween. In the embodiment depicted in FIG. 2, two vehicle icons 252 are depicted to represent the nearby vehicles that are positioned within a predetermined distance forward the aircraft. However, in other embodiments, icons of all vehicles that are located within a predetermined radius of the aircraft may alternatively be displayed. Similar to the vehicle icons 214 of the lateral view display 206, the vehicle icons 252 of the vertical situation view display 208 may include identifying information, direction, and/or speed information that may be displayed therewith. In the embodiment depicted in FIG. 2, flight identification text is shown adjacent each vehicle icon 252.

The altitude lines 254, 256, 258, 260, 262, 264, 266 extend across the vertical view situation display 208, and each represents a vertical distance from the aircraft. More preferably, the altitude lines each represent planes that are a predetermined vertical distance from the aircraft. Additionally, the altitude lines 254, 256, 258, 260, 262, 264, 266 are preferably equally spaced apart.

In one exemplary embodiment, the display 208 is aircraft center-referenced, and one of the altitude lines 260 represents a plane that is substantially even with, or 0 feet from, the aircraft, while the other altitude lines 254, 256, 258, 262, 264, 266 represent predetermined distances from the aircraft. For example, three altitude lines 254, 256, 258 represent planes above the aircraft that are 45,000 feet, 30,000 feet, and 15,000 above the aircraft, respectively, and three altitude lines 262, 264, 266 represent planes below the aircraft that are 15,000 feet, 30,000 feet, and 45,000 feet below the aircraft, respectively. It will be appreciated that fewer or more altitude lines may be depicted, if desired. Moreover, it will be further appreciated that each altitude line may represent planes that are closer together or further away from each other. Although the altitude lines 254, 256, 258, 262, 264, 266 are depicted as being equally spaced apart, it will be appreciated that one or more of the altitude lines may not be equidistant from an adjacent altitude line. For example, one altitude line may move vertically along the vertical view situation display 208 to indicate movement of a nearby vehicle and/or direction and/or speed trends of the vehicle.

The vertical range lines 268, 270 extend vertically across the display 208 and correspond with the range rings 218 in the lateral display 206. Accordingly, the two vertical lines 268 closest to the aircraft icon 250 represent the range ring 218 closest to aircraft icon 212, and so on. Similar to the range rings 218, the vertical range lines 268, 270 may be used to indicate sequential ranges, such as fixed distance or time ranges needed to travel from the top-view aircraft symbol 212 to another position, or any other information that may be useful to a pilot. It will be appreciated that although two sets of vertical range lines 268, 270 are shown, more or fewer range lines may alternatively be included.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft and a vehicle, comprising:
    a processor adapted to receive data representative of a position of the aircraft and operable, in response thereto, to supply one or more image rendering display commands; and
    a display device coupled to receive the image rendering display commands and operable, in response thereto, to simultaneously render:
    a lateral view image comprising (i) a first aircraft icon representing the position of the aircraft and (ii) one or more range rings indicating distances from the aircraft, and
    a vertical view image comprising (i) a second aircraft icon representing the position of the aircraft, (ii) one or more altitude lines, wherein each altitude line extends horizontally at least partially across the vertical view image and represents a vertical distance from the aircraft, and (iii) one or more vertical range lines extending vertically across at least a part of the vertical view image, each vertical range line corresponding with each range ring of the one or more range rings of the lateral situation image.

2. The system of claim 1, wherein a first altitude line of the one or more altitude lines represents a plane that is substantially even with the aircraft.

3. The system of claim 1, wherein the processor is further adapted to receive data representative of a position of the vehicle, the vehicle located within a predetermined distance from the aircraft and the display device is further configured to simultaneously render a first vehicle icon on the lateral view image representing the position of the vehicle while rendering the first-aircraft icon.

4. The system of claim 3, wherein a first altitude line of the one or more altitude lines represents a first plane within which the aircraft is positioned and a second altitude line of the one or more altitude lines represents a second plane that is parallel to the first plane that indicates a pre-determined distance from the aircraft.

5. The system of claim 3, wherein vehicle identifying information is displayed with the first vehicle icon.

6. The system of claim 3, wherein the processor is further adapted, in response to the data representative of the position of the vehicle located within a predetermined distance from the aircraft, to render display command to the display device to simultaneously render a second vehicle icon on the vertical view image representing the position of the vehicle while rendering the first aircraft icon.

7. The system of claim 1, wherein each range ring of the one or more range rings represents a fixed distance from the aircraft.

8. The system of claim 1, wherein each range ring of the one or more range rings represents a time range for traveling from the position of the aircraft to another position.

9. A display system for an aircraft, comprising:
    a processor adapted to receive data representative of a position of the aircraft and data representative of a position of a vehicle located within a predetermined distance of the aircraft, and operable, in response thereto, to supply one or more image rendering display commands; and
    a display device coupled to receive the image rendering display commands and operable, in response thereto, to simultaneously render:
    a lateral view image including (i) a first aircraft icon representing the position of the aircraft, (ii) a first vehicle icon representing the position of the vehicle, and (iii) one or more range rings indicating distances from the aircraft, and
    a vertical view image including (i) a second aircraft icon representing the position of the aircraft, (ii) a second vehicle icon representing the position of the vehicle, (iii) one or more vertical range lines extending vertically across at least a part of the vertical view image, each vertical range line corresponding with each range ring of the one or more range rings of the lateral view image and (iv) one or more altitude lines, wherein (i) each altitude line extends at least partially across the vertical view image and represents a vertical distance from the aircraft, (ii) a first altitude line of the one or more altitude lines represents a first plane within which the aircraft is located, and (iii) a second altitude line of the one or more altitude lines represents a second plane that is parallel to the first plane and is a predetermined distance from the aircraft.

10. The system of claim 9, wherein the lateral view image includes vertical distance information that is displayed simultaneously with the first vehicle icon.

11. A method of displaying on an aircraft flight deck display system an altitude of a vehicle located within a predetermined distance of an aircraft, the method comprising the steps of:

processing data representative of a position of the aircraft and data representative of a position of the vehicle;

simultaneously displaying on a lateral view image (i) a first aircraft icon representing the position of the aircraft, (ii) a first vehicle icon representing the position of the vehicle, and (iii) one or more range rings indicating distances from the aircraft; and simultaneously displaying on a vertical view image (i) a second aircraft icon representing the position of the aircraft, (ii) a second vehicle icon representing the position of the vehicle, (iii) one or more altitude lines, wherein each altitude line extends at least partially across the vertical view image and represents one or more vertical distances from the aircraft, and (iv) one or more vertical range lines extending vertically across at least a part of the vertical view image, each vertical range line corresponding with each range ring of the one or more range rings of the lateral view image.

12. The method of claim 11, wherein the step of simultaneously displaying the vertical view image comprises simultaneously displaying a first altitude line of the one or more altitude lines representing a plane that is substantially even with the aircraft and a second altitude line of the one or more altitude lines representing a predetermined vertical distance from the aircraft.

13. The method of claim 11, wherein the step of simultaneously displaying the vertical view image comprises simultaneously displaying identification information with the second vehicle icon.

14. The method of claim 11, wherein the step of processing further comprises processing data representative of a position of a second vehicle within the predetermined distance from the aircraft and the method further comprises the step of simultaneously rendering a third vehicle icon on the lateral view image representing the second vehicle while displaying the first vehicle icon and simultaneously rending a fourth vehicle icon on the vertical view image representing the second vehicle while displaying the second vehicle icon.

15. The method of claim 14, wherein the step of simultaneously rendering the third vehicle icon comprises simultaneously displaying altitude information relating to the third vehicle icon.

16. The method of claim 11, wherein the step of simultaneously displaying on a lateral view image comprises the step of displaying altitude information relating to the first vehicle icon.

* * * * *